United States Patent [19]
Ishida et al.

[11] Patent Number: 5,435,654
[45] Date of Patent: Jul. 25, 1995

[54] SEAL DEVICE FOR ROLLING BEARING

[75] Inventors: Yasutaka Ishida, Fujisawa; Hironori Suzuki, Tokyo; Shuji Sudo, Fujisawa, all of Japan

[73] Assignees: NSK Ltd, Tokyo; Sudo Corporation, Kenagawa, both of Japan

[21] Appl. No.: 312,889

[22] Filed: Sep. 27, 1994

[30] Foreign Application Priority Data

Sep. 27, 1993 [JP] Japan .................................. 5-240042
Dec. 22, 1993 [JP] Japan .................................. 5-068491

[51] Int. Cl.6 .................................................. F16C 33/78
[52] U.S. Cl. .................................. 384/488; 277/178; 384/477
[58] Field of Search ............... 384/477, 480, 484, 488; 277/178, 181, 184, 189, 152

[56] References Cited

U.S. PATENT DOCUMENTS

| | | | |
|---|---|---|---|
| 2,031,571 | 2/1936 | Nilsson | 384/488 |
| 2,034,567 | 3/1936 | Fernström | 384/488 |
| 2,718,441 | 9/1955 | Smith | 384/484 |
| 3,071,385 | 1/1963 | Greiner | 384/484 X |
| 3,597,030 | 8/1971 | Hallerback | 384/488 |
| 3,672,736 | 6/1972 | Rathbone | 384/488 |
| 4,183,592 | 1/1980 | Sudo et al. | 384/488 |

FOREIGN PATENT DOCUMENTS

| | | |
|---|---|---|
| 49-114350 | 9/1974 | Japan . |
| 54-68048 | 5/1979 | Japan . |
| 58-112733 | 8/1983 | Japan . |
| 62-167926 | 7/1987 | Japan . |
| 292117 | 7/1990 | Japan . |
| 516411 | 4/1993 | Japan . |

*Primary Examiner*—Thomas R. Hannon
*Attorney, Agent, or Firm*—Helfgott & Karas

[57] ABSTRACT

A seal device for use in a rolling bearing has a shield plate which is made of an annular metal plate, the outer peripheral half of the annular metal plate comprising a radially inner flat portion and a radially outer bent tail portion which is folded radially inwards to cooperate with the flat portion to provide the shield plate with an outer peripheral edge which is fitted into a retaining groove formed in the outer ring of the bearing.

4 Claims, 8 Drawing Sheets

SEAL DEVICE FOR ROLLING BEARING

FIELD OF THE INVENTION

The present invention is related to a seal device for a rolling bearing, specifically a seal device installed in a miniature bearing for rotation support in a hard disc drive apparatus (HDD), a video tape recorder (VTR) etc.

DESCRIPTION OF THE PRIOR ART

The hard disc drive apparatus (HDD), the video tape recorder (VTR) etc. have a rotation support mechanism comprising a rolling bearing, as shown in FIG. 1.

The rolling bearing comprises an outer ring 1 having a outer raceway 2 on its inner peripheral surface at its mid section, an inner ring 3 having an inner raceway 4 on its outer peripheral surface at its mid section, and a plurality of rolling elements 5 provided rotatably between the outer raceway 2 and the inner raceway 4, so that the outer ring 1 and the inner ring 3 are rotatable with reference to each other. The outer ring 1 and the inner ring 3 define an opening at either axial end. In addition, there is a cage or retainer 6 for rotatably supporting the rolling elements 5.

The rolling bearing that is a rotation support mechanism for HDD, VTR etc., specifically the portion containing the rolling elements 5 between the outer raceway 2 and the inner raceway 4, is filled with grease so as to lubricate the rolling elements 5, the outer raceway 2 and the inner raceway 4.

Accordingly, there is a seal device in the rolling bearing to prevent the grease from leaking out of the portion, thus isolating the interior of the rolling bearing from outside.

Various modifications of such a seal device are known in the art. For example, the seal devices as shown in FIG. 2 and FIG. 3 are disclosed in Japanese Utility Model First Publication KOKAI Nos. S54-68048, S58-112773, H2-92117, Japanese Patent First Publication KOKAI No. 62-167926, and generally used in the industry.

This seal device comprises a shield plate 7 made of an annular metal plate the outer peripheral edge of which is crimped into the retaining groove 8 which is formed on the inner peripheral surface of the outer ring 1 at its end section (see FIG. 3) It will be noted that the annular groove 8 is formed between an annular land 8a closer to the opening at the axial end section of the outer ring 1 and an annular step portion 11 closer to the outer raceway 2.

In the assembling process of the shield plate 7, a blank 9 for the shield plate 7 is first prepared to have an outer peripheral portion formed in a J-shape in cross section as shown in FIG. 2 in order to form the shield plate 7. The J-shaped peripheral portion has its head portion axially directed and continued to the mid portion of the blank 9 which is abutted to the step portion 11 of the outer ring 1. The longer side of the J-shaped portion forms an outer peripheral surface of the blank 9, and the bent tail portion 10 of the J-shaped section is faced axially outside. The outer peripheral surface of the blank 9 has a diameter smaller than the diameter of the bottom of the groove 8, or substantially the same as that of the inner periphery of the annular land 8a.

In installation, the blank 9 is set radially inside the annular groove 8 and land 8a, then the bent tail portion 10 is pressed toward the step portion 11, so that the bent tail portion 10 is plastically deformed and forced into the retaining groove 8 as shown in FIG. 3. Consequently, the outer peripheral edge of the shield plate 7 is secured to and supported by the retaining groove 8.

FIG. 4 shows another prior art seal device as disclosed in Japanese Utility Model First Publication KOKAI No. 49-114350. This seal device comprises a shield plate 7a the outer peripheral edge of which is formed with a cylindrical portion 12 having a plurality of radially outward stop projections 13.

Then, the shield plate 7a is retained in and supported by the outer ring 1, through engagement of the stop projections 13 with the lands 8a forming the wall of the retaining groove 8 at the axial end section of the outer ring 1.

FIG. 5 shows another prior art seal device as disclosed in Japanese Utility Model Publication KOKOKU No. H5-16411. The seal device in this publication comprises a shield plate 7b made of an annular metal plate and having an outer peripheral portion 14 formed in a J-shape in cross section. In other words, the shield plate 7b is bent and folded in its outer peripheral portion 14 axially outward (right in FIG. 5) to form the J-shape in cross-section.

On the other hand, the outer ring 1 has a retaining groove 8 on its inner peripheral surface and partly defined by a land 8a at its axial end (right end in FIG. 5). Elastic engagement of the bent peripheral portion 14 with the groove 8 provides a support of the shield plate 7b inside the outer ring 1.

In addition, FIG. 6 shows another prior art seal device as shown in U.S. Pat. No. 4,183,592. The seal device in this publication comprises an annular shield plate 7c formed in an offset shape in cross section and having a head portion 16 at its outer periphery. On the other hand, the outer ring 1 has a tapered face 15 on its inner peripheral surface at its either axial end section. The tapered face 15 is made to have its inner diameter gradually reduced toward the opening at the either end section of the outer ring 1.

The outer peripheral edge or head portion 16 of the shield plate 7c is elastically press-fitted into the tapered face 15 so as to support the shield plate 7c inside the outer ring 1.

There are some problems in the above-mentioned prior art seal devices for rolling bearing as follows;

The seal device as shown in FIGS. 2 and 3 is costly in production and causes the outer ring 1 to be deformed. Specifically, the blank 9 for shield plate 7 must be crimped or plastically deformed to fit the bent tail portion 10 into the groove 8 for securely supporting the shield plate 7 inside the outer ring 1. The installation of the shield plate 7 is troublesome, and crimping requires a complicated processing apparatus. Accordingly, the production cost is increased for the rolling bearing with the seal device installed in it.

As the bent tail portion 10 is plastically deformed, the bent tail portion 10 strongly presses radially outward the end section of the outer ring 1 where the retaining groove 8 is formed. Consequently, the outer ring 1 is elastically deformed in that location so as to have a larger diameter. The amount of elastic deformation is not uniform along the circumference, so that the outer ring 1 or inner ring 3 of the rolling bearing when rotated at a high velocity is inclined to be subjected to harmful vibrations due to unbalance in rotation or subtle undulation on the surface of the outer raceway 2. Particularly, in the recent compact HDD etc. having a thin thickness of the outer ring 1, such elastic deformation could not be ignored.

Such problems of elastic deformation are caused in the structures as shown in FIGS. 4 and 6, too. Specifically, the cylindrical portion 12 of the shield plate 7a in FIG. 4, and the outer circumferential edge or head portion 16 of the shield plate 7c in FIG. 6 strongly press radially outwards against the end section of the outer ring 1 where the retaining groove 8 is formed, so that that end section of the outer ring 1 is elastically deformed enlarging its diameter, thus causing harmful vibrations etc.

In the case of the structure as shown in FIG. 5, although elastic deformation of the outer ring 1 is prevented, the shield plate 7b is subject to harmful plastic deformation upon installation.

Since the bent peripheral portion 14 is arranged with its tail portion outwardly faced in this structure of FIG. 5, the shield plate 7b must be pressed with a pushing tool abutted to the tail portion of the bent peripheral portion 14 in order to have the bent peripheral portion 14 fitted into the retaining groove 8.

The shield plate 7b for example installed in a miniature bearing is made of a thin metal plate having a thickness up to 0.16 mm, so that the bent peripheral portion 14 is inclined to be plastically deformed through the press step where the tool mentioned above is engaged with the bent peripheral portion 14 in a very narrow space. Plastic deformation caused in such a situation is not uniform in the circumferential direction, so that harmful vibrations etc. are inclined to be produced when the outer ring 1 is rotated at a high speed.

SUMMERY OF THE INVENTION

An objective of this invention is to provide a seal device for a rolling bearing to overcome the problems as mentioned above.

This objective is accomplished by a seal device which is used in a rolling bearing, and has a shield plate made of an annular metal plate, the outer peripheral half of the annular metal plate comprising a radially inner flat portion and a radially outer bent tail portion which is folded radially inwards to cooperate with the flat portion to provide the shield plate with an outer peripheral edge with elasticity which is fitted into a retaining groove formed in the outer ring of the bearing.

DESCRIPTION OF THE PREFERRED EMBODIMENTS

Figure 1:
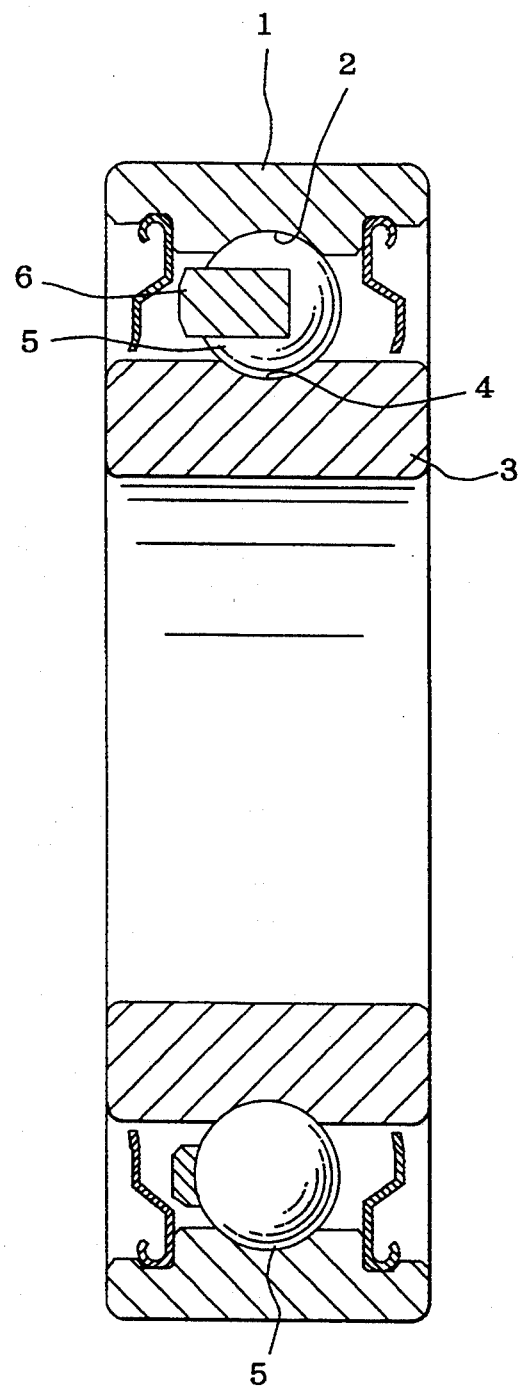
FIG. 1 is a cross sectional view of a prior art ball bearing to which the seal device of the present invention is applied.
Figure 2:
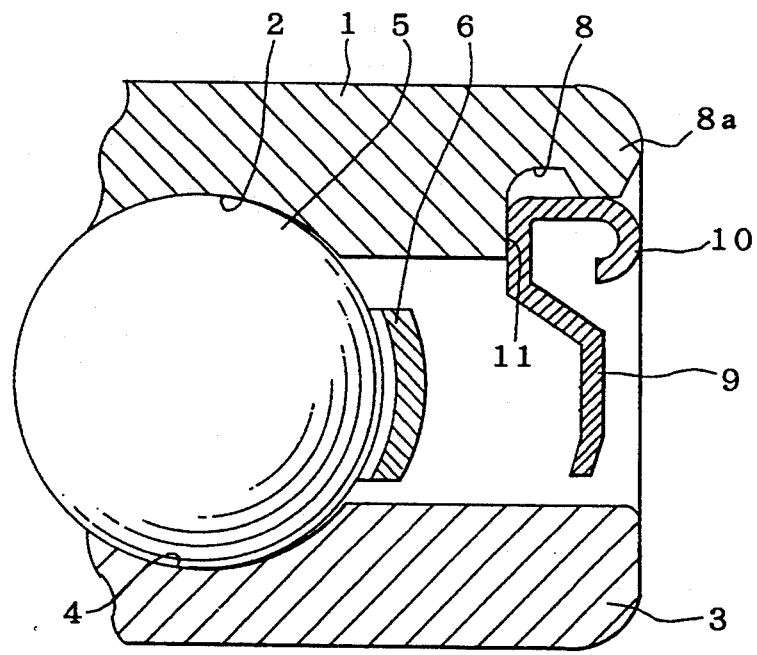
FIG. 2 is a partly cut away, cross sectional view of the ball bearing to which a prior art seal device is applied to, showing a state just before the shield plate is crimped into the retaining groove of the outer ring.
Figure 3:
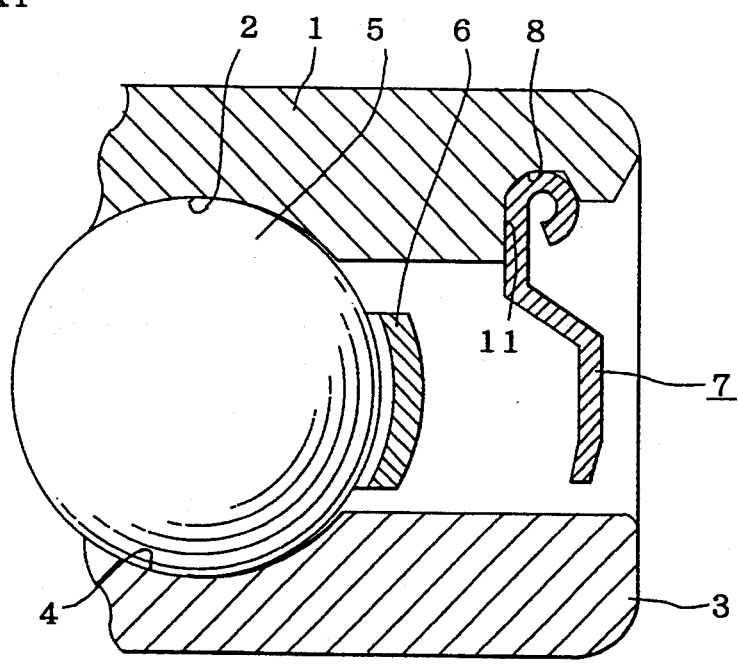
FIG. 3 is a partly cut away, cross sectional view of the ball bearing of FIG. 2, showing a state after the shield plate is crimped into the relating groove of the outer ring.
Figure 4:
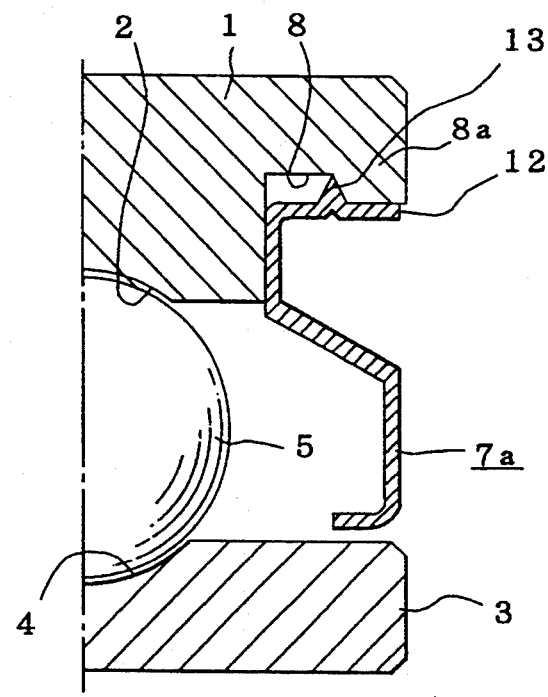
FIG. 4 is a partly cut-away, cross sectional view of the ball bearing to which another prior art seal device is applied, wherein the shield plate is set into the retaining groove of the outer ring.
Figure 5:
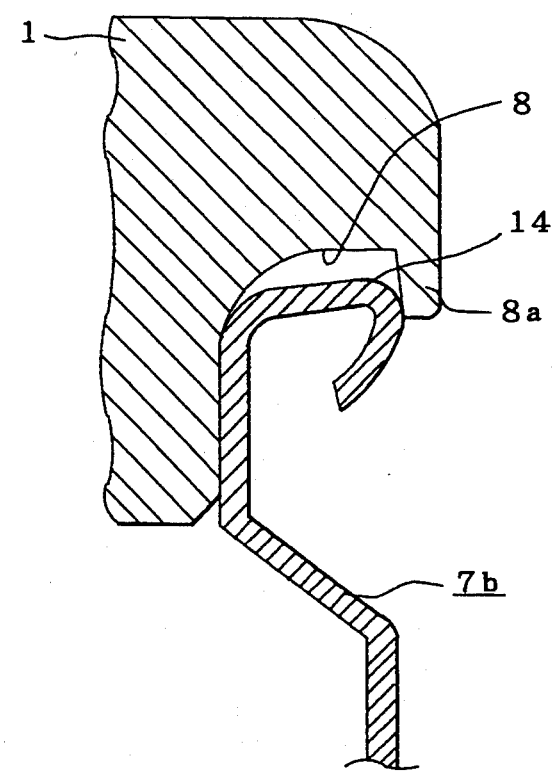
FIG. 5 is a partly cut-away, cross sectional view of another prior art seal device in the rolling bearing after the shield plate is set into the retaining groove of the outer ring.
Figure 6:
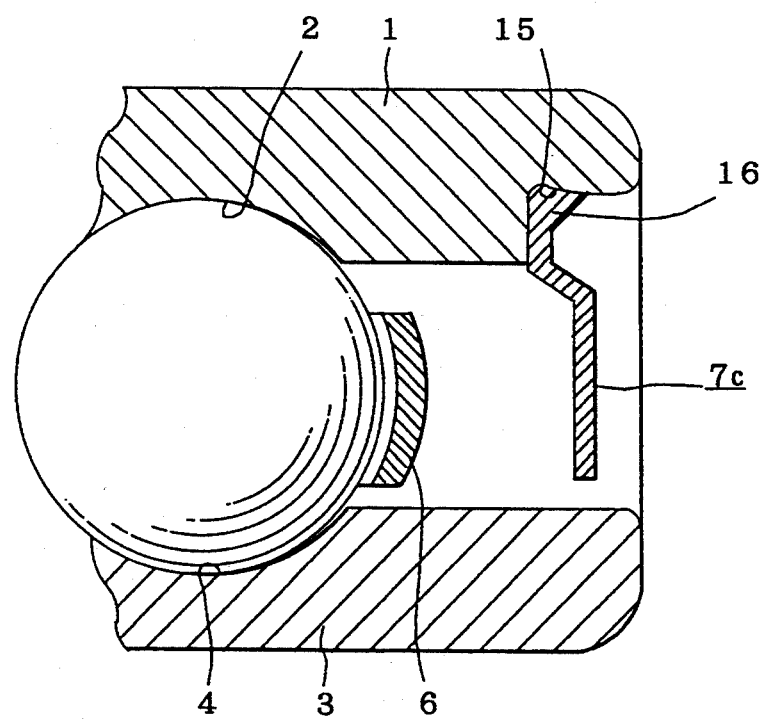
FIG. 6 is a partly cut-away, cross sectional view of the ball bearing to which another prior art seal device is applied, wherein the shield plate is set into the retaining groove of the outer ring.
Figure 7:
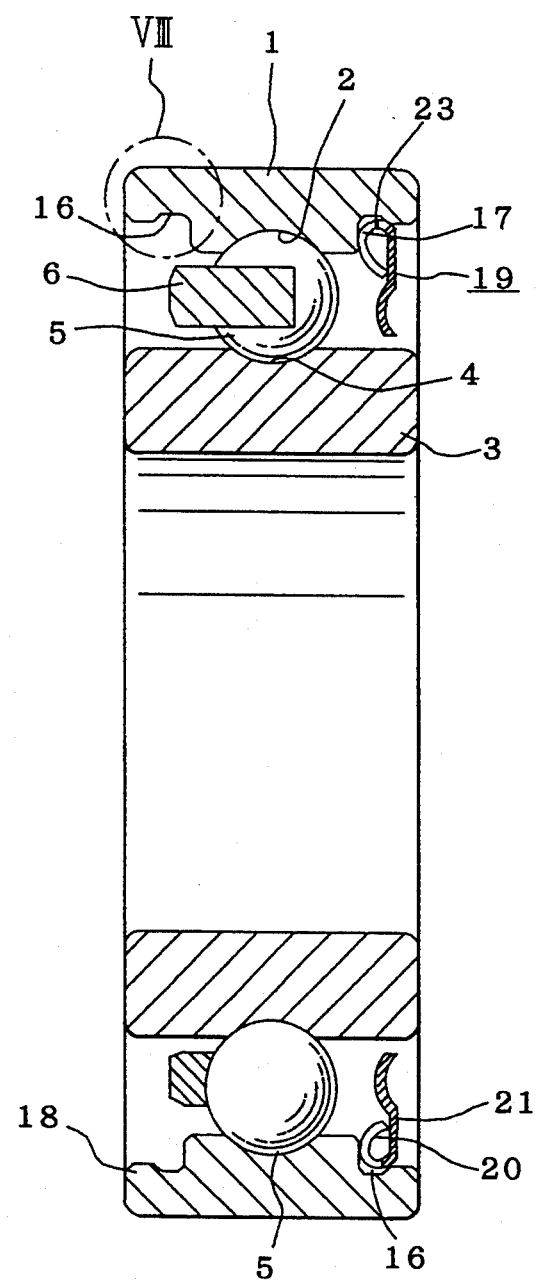
FIG. 7 is a cross sectional view of a rolling bearing having a seal device installed therein according to an embodiment of the present invention.
Figure 8:
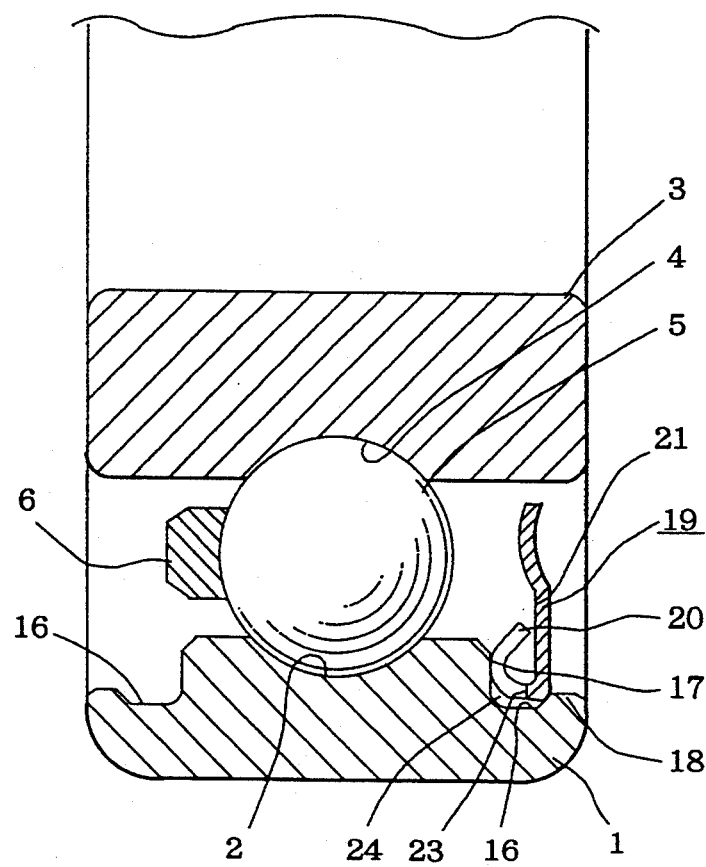
FIG. 8 is an enlarged view of the lower part of the rolling bearing of FIG. 7.

FIG. 7 to FIG. 10 show an embodiment of the present invention.

The rolling bearing in which the seal device of the present embodiment is installed comprises an outer ring or race 1 having an outer raceway 2 on its inner peripheral surface, specifically at the mid section, an inner ring or race 3 having an inner raceway 4 on its outer peripheral surface, specifically at the mid section, and a plurality of rolling elements 5 rotatably provided between the outer raceway 2 and the inner raceway 4.

The outer ring or race 1 and the inner or race ring 3 define an opening at either axial end.

The seal device is provided closer to the opening to isolate from the outside the space where the rolling elements 5 are disposed between the outer and inner raceways 2 and 4.

The seal device for the rolling bearing in the present embodiment comprises an axial end section of the inner peripheral surface of the outer ring 1 where a retaining groove 16 is formed generally along the circumference, and a shield plate 19 having an outer peripheral edge engaged with the retaining groove 16 and an inner peripheral edge disposed adjacent to and spaced from the axial end section of the outer peripheral surface of the inner ring 3.

The retaining groove 16 is defined by a relatively larger annular step portion 17 closer to the outer raceway 2 and a relatively smaller annular projection 18 closer to the opening at the axial end of the outer ring 1.

The shield plate 19 is made of an annular metal plate, and comprised of a radially inner half and a radially outer half which comprises a flat portion 21 and a bent tail portion 20 along the outer periphery of the flat portion 21. Specifically, the bent tail portion 20 is formed by folding the outer peripheral portion of the annular metal plate, and is elastically easily deformed. The flat portion 21 and the bent tail portion 20 cooperate to form the outer peripheral edge of the shield plate 19.

The shield plate 19 is supported by the retaining groove 16 with the bent tail portion 20 abutted to the step portion 17 closer to the outer raceway 2 and the projection 18 closer to the axial end of the outer ring 1, with the flat portion 21 faced to the opening.

The seal device for rolling bearing having a structure as mentioned above can have the shield plate 19 incorporated in it without the outer ring 1 being subjected to the elastic deformation. When the bent tail portion 20 is pressed into the retaining groove 16 to set the shield plate 19 into the outer ring 1, a pushing tool is pressed against the flat portion 21 of the shield plate 19, where a broader area is available for the tool to be abutted to the shield plate 19. This avoids the plastic deformation of the shield plate 19 upon installation.

Consequently, there is no undulation in the outer raceway 2 nor unbalance in rotation. The undulation and unbalance would cause harmful vibrations etc. when the outer ring 1 and the shield plate 19 are rotated at a higher speed. In addition, there is no need of crimping the shield plate 19 for installation, resulting in an inexpensive production cost for the rolling bearing having a seal device installed in it.

Now, the retaining groove 16 is detailed with reference to FIG. 9.

Figure 9:
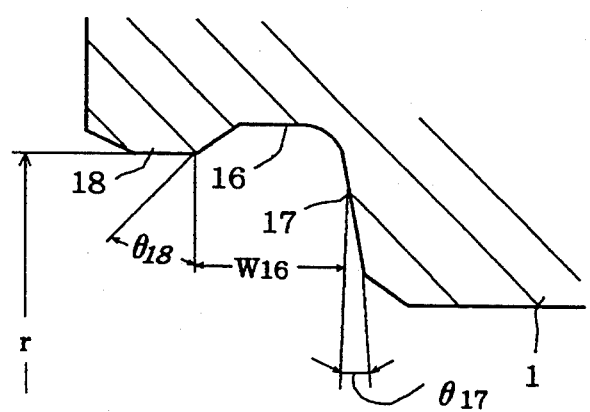
FIG. 9 is an enlarged view of the portion VIII in FIG. 7.

The retaining groove 16 formed generally along the circumference on the inner periphery of the outer ring 1 at its end section is defined by the step portion 17 having a relatively larger height closer to the outer raceway 2 (right in FIG. 9) and the projection 18 having a relatively smaller height closer to the open end section of the outer ring 1 (left in FIG. 9).

The width $W_{16}$ of the retaining groove 16, the tilting angle $\theta_{17}$ of the step portion 17, and the tilting angle $\theta_{18}$ of the axial inside surface of the projection 18 are determined corresponding to the shape and dimension of the bent tail portion of the shield plate 19. For example, when the present invention is applied to a miniature bearing having an inner diameter of 4 mm and an outer diameter of 9 mm, the following dimensions are proposed;

$W_{16}$=0.25 mm–0.35 mm (desirably 0.27 mm–0.33 mm), $\theta_{17}$=0 degrees–10 degrees (desirably 6 degrees–8 degrees), $\theta_{18}$=40 degrees–60 degrees (desirably 45 degrees–55 degrees).

The projection 18 has an inner diameter r which is slightly smaller than the outer diameter R of the shield plate 19 (see FIG. 10), specifically for example by the amount of 0.01 mm–0.04 mm, desirably 0.015 mm–0.03 mm. The shield plate 19 is made of a stainless steel with a thickness of 0.08 mm in this case.

Figure 10:
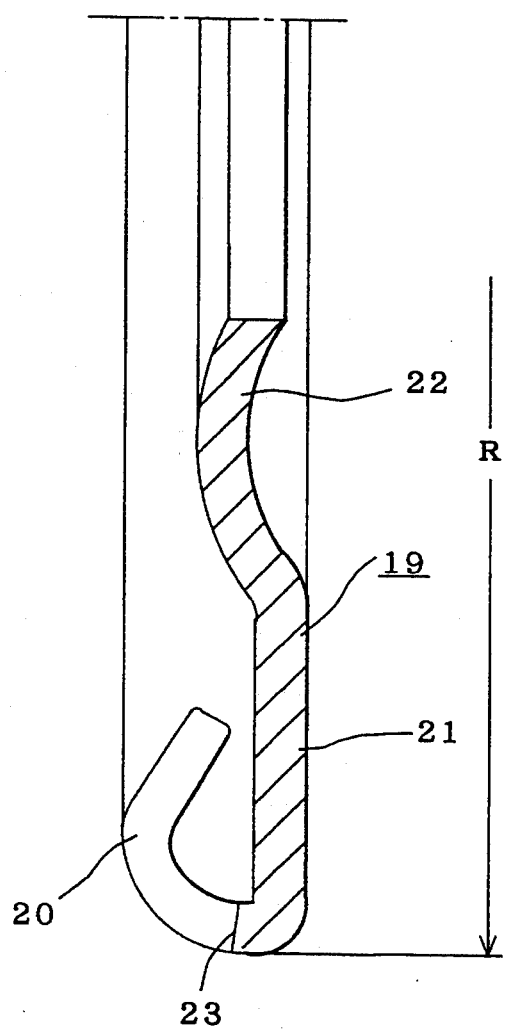
FIG. 10 is a partly cross sectional, side elevational view of the radially outer half of the shield plate of the seal device according to an embodiment of the present invention.

The shield plate 19 is provided to isolate from the outside the space where the rolling elements 5 are disposed between the outer raceway 2 and the inner raceway 4 and made of an annular metal plate e.g. of stainless steel, carbon steel etc. as shown in FIG. 10.

The flat portion 21 formed in the radially outer half of the shield plate 19 (the lower half of the cross sectional portion shown in FIG. 10) has an axially outer surface (right surface in FIG. 10) where the tool for pressing is abutted at its end face to a broader area of the axially outer surface of the flat portion 21.

A curved portion 22 is formed in the radially inner half of the shield plate 19 (the upper half of the cross sectional portion shown in FIG. 10) and has an arcuate shape in cross section.

The curved portion 22 can be replaced by a flat portion, but the curved section 22 makes the section modulus of the shield plate 19 larger, so that the shield plate 19 is hardly deformed.

The bent tail portion 20 is formed along the outer periphery of the flat portion 21, so that the outer periphery of the shield plate 19 is hollow and resiliently deformable.

The bent tail portion 20 is formed by folding the outer circumferential portion of the metal plate by more than 180 degrees, so that the size of the outer peripheral portion of the shield plate 19 in the thickness direction (left and right directions in FIG. 10) can be variably reduced due to the elastic deformation.

In the embodiment of the present invention, the annular tip end of the bent tail portion 20 is separated from the side surface of the flat section 21.

In addition, a plurality of radial slits 23 (e.g. nine) are formed and separated from each other in the circumferential direction of the bent tail portion 20, so that the bent tail portion 20 is divided, e.g. nine, in the circumferential direction. Consequently, the bent tail portion 20 is easily deformed elastically in the thickness direction of the shield plate 19.

The elasticity of the bent tail portion 20 is thus adjustable e,g, by changing the space between the annular tip end of the bent tail portion 20 and the flat portion 21 of the shield plate 19, changing the slits 23 in number, changing the thickness and/or hardness of the metal plate for the shield plate 19, or changing the thickness etc. of the bent tail portion 20.

The seal device for rolling bearing in the present embodiment is assembled by engaging the shield plate 19 as mentioned above with the retaining groove 16 formed on the inner periphery of the outer ring 1 at its axial end section and having a structure as mentioned above.

Specifically, the shield plate 19 is fitted into the outer ring 1 with the bent tail portion 20 faced to the inside, that is to the space where the rolling elements 5 are disposed. In the assembled condition where the outer peripheral edge of the shield plate 19 is securely supported by the retaining groove 16, the bent tail portion 20 is abutted to the step portion 17.

In the seal device for rolling bearing in the present invention, the outer ring 1 hardly elastically deformed when the shield plate 19 is mounted to the outer ring 1.

The shield plate 19 is retained within the outer ring 1 through engagement of the bent tail portion 20 formed along the outer peripheral edge of the shield plate 19 with the retaining groove 16 formed on the inner peripheral surface of the outer ring 1 at its axial end section, so that there is a clearance 24 between the outer peripheral surface of the bent tail portion 20 and the bottom portion of the retaining groove 16. Accordingly, the outer diameter of the outer ring 1 is hardly enlarged radially outwards by the bent tail portion 20 upon installation. By adjusting the elasticity of the bent tail portion 20 and the width of the retaining groove 16, sufficient friction forces are produced between the retaining groove 16 and the bent tail portion 20. Accordingly, the shield plate 19 never rotates with reference to the outer ring 1.

When the bent tail portion 20 is press-fitted into the retaining groove 16 to install the shield plate 19 in the outer ring 1, the pushing tool with a flat tip end for pressing is abutted to the flat portion 21, so that the shield plate 19 is forcedly inserted into the interior of the outer ring 1. Then, the bent tail portion 20 is elastically deformed for engagement of the bent tail portion 20 with the retaining groove 16. Since the flat tip end for pressing of the pushing tool is abutted to the flat portion 21 of the shield plate 19 in a relatively broader contact area. Accordingly, no part of the shield plate 19 is plastically deformed.

Figure 11:
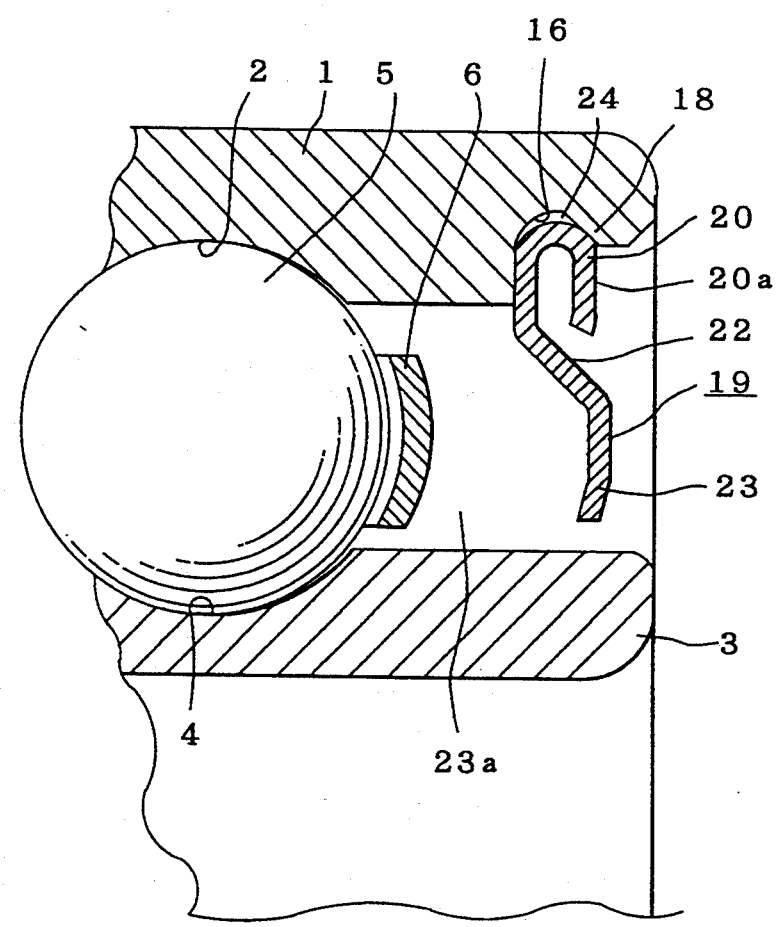
FIG. 11 is a partly cut-away, cross sectional view of a ball bearing to which another embodiment of the seal device of the present invention is applied.

FIG. 11 shows another embodiment of the present invention.

The rolling bearing in which the seal device of the present embodiment is installed comprises an outer ring or race 1 having an outer raceway 2 on its inner peripheral surface, specifically at the mid section, an inner ring or race 3 having an inner raceway 4 on its outer peripheral surface, specifically at the mid section, and a plurality of rolling elements 5 rotatably provided between the outer raceway 2 and the inner raceway 4.

The outer ring or race 1 and the inner or race ring 3 define an opening at either axial end.

The seal device is provided closer to the opening to isolate from the outside the space where the rolling elements 5 are disposed between the outer and inner raceways 2 and 4.

The seal device for the rolling bearing in the present embodiment comprises an axial end section of the inner peripheral surface of the outer ring 1 where a retaining groove 16 is formed generally along the circumference, and a shield plate 19 having an outer peripheral edge engaged with the retaining groove 16 and an inner peripheral edge disposed adjacent to and spaced from the axial end section of the outer peripheral surface of the inner ring 3.

The retaining groove 16 is defined by a relatively larger annular step portion 17 closer to the outer raceway 4 and a relatively smaller annular projection 18 closer to the opening at the axial end of the outer ring 1.

The shield plate 19 is made of an annular metal plate, and comprised of a radially inner half and a radially outer half which comprises a flat portion 21 and a bent tail portion 20 along the outer periphery of the flat portion 21. Specifically, the bent tail portion 20 is formed by folding the outer peripheral portion of the annular metal plate, and is elastically easily deformed. In addition, the bent tail portion 20 has a flat portion 20a which extends radially or normal with reference to the axis of the outer ring 1.

The bent tail portion 20 and the flat portion 21 cooperate to form the outer peripheral edge of the shield plate 19. The shield plate 19 is supported by the retaining groove 16 with the outer peripheral edge abutted to the step portion 17 closer to the outer raceway 2 and the projection 18 closer to the axial end of the outer ring 1. The flat portion 21 is abutted to the step portion 17 while the flat portion 20a is faced to the opening.

The seal device for rolling bearing having a structure as mentioned above can have the shield plate 19 incorporated in it without the outer ring 1 being subjected to the elastic deformation. When the bent tail portion 20 is pressed into the retaining groove 16 to set the shield plate 19 into the outer ring 1, a pushing tool is pressed against the flat portion 20a of the bent tail portion 20 of the shield plate 19, where a broader area is available for the tool to be abutted to the shield plate 19. This avoids the plastic deformation of the shield plate 19 upon installation.

Consequently, there is no undulation in the outer raceway 2 nor unbalance in rotation. The undulation and unbalance would cause harmful vibrations etc. when the outer ring 1 and the shield plate 19 are rotated at a higher speed. In addition, there is no need of crimping the shield plate 19 for installation, resulting in an inexpensive production cost for the rolling bearing having a seal device installed in it.

Now, the seal device of this embodiment is detailed.

The retaining groove 16 formed generally along the circumference on the inner periphery of the outer ring 1 at its end section is defined by the step portion 17 having a relatively larger height closer to the outer raceway 2 (left in FIG. 11) and the projection 18 having a relatively smaller height closer to the open end section of the outer ring 1 (right in FIG. 11).

The shield plate 19 is provided to isolate from the outside the space where the rolling elements 5 are disposed between the outer raceway 2 and the inner raceway 4 and made of an annular metal plate e.g. of stainless steel, carbon steel etc.

The flat portion 21 formed in the radially outer half of the shield plate 19.

The bent tail portion 20 is formed along the outer periphery of the flat portion 21, so that the outer periphery of the shield plate 19 is hollow and resiliently deformable.

The bent tail portion 20 is formed by folding the outer circumferential portion of the metal plate by more than 180 degrees, so that the size of the outer peripheral portion of the shield plate 19 in the thickness direction (left and right directions in FIG. 11) can be variably reduced due to the elastic deformation.

The flat portion 20a of the bent tail portion 20 is extended radially inwards from the outer peripheral edge of the shield plate 19, in other words, normal to the central axis of the outer ring 1 (in up and down directions and front and rear directions of the sheet), and placed between the outer peripheral edge of the shield plate 19 and the tip end of the bent tail portion 20.

The flat portion 20a has an axially outer surface (right surface in FIG. 11) where the tool for pressing is abutted at its end face to a broader area of the axially outer surface of the flat portion 20a.

A tilted portion 22 is formed in the radially inner half of the shield plate 19 and Continuous to the radially inner end portion 23, such that the radially inner end portion 23 is offset with reference to the flat portion 21, or displaced toward the opening (right in FIG. 11). Since the radially inner half of the shield plate 19 is thus bulged, the space 23a inside the shield plate 19 is increased to hold a sufficient amount of grease in it.

In the embodiment of the present invention, the annular tip end of the bent tail portion 20 is separated from the side surface of the flat section 21 and from the tilted portion 22.

In addition, a plurality of radial slits (not shown) are formed and separated from each other in the circumferential direction of the bent tail portion 20, so that the bent tail portion 20 is divided, e.g. nine, in the circumferential direction. Consequently, the bent tail portion 20 is easily deformed elastically in the thickness direction of the shield plate 19.

The elasticity of the bent tail portion 20 is thus adjustable e.g. by changing the space between the annular tip end of the bent tail portion 20 and the flat portion 21 and tilted portion 22 of the shield plate 19, changing the slits in number, changing the thickness and/or hardness of the metal plate for the shield plate 19, or changing the thickness etc. of the bent tail portion 20.

The seal device for rolling bearing in the present embodiment is assembled by engaging the shield plate 19 as mentioned above with the retaining groove 16 formed on the inner periphery of the outer ring 1 at its axial end section and having a structure as mentioned above.

Specifically, the shield plate 19 is fitted into the outer ring 1 with the bent tail portion 20 faced to the opening, that is opposite to the space where the rolling elements 5 are disposed. In the assembled condition where the outer peripheral edge of the shield plate 19 is securely supported by the retaining groove 16, the flat portion 21 is abutted to the step portion 17 while the bent tail portion 20 is abutted to the projection 18.

In the seal device for rolling bearing in the present invention, the outer ring 1 is hardly elastically deformed when the shield plate 19 is mounted to the outer ring 1.

The shield plate 19 is retained within the outer ring 1 through engagement of the bent tail portion 20 formed along the outer periphery of the shield plate 19 with the retaining groove 16 formed on the inner peripheral surface of the outer ring 1 at its axial end section, so that there is a clearance 24 between the outer peripheral surface of the bent tail portion 20 and the bottom portion of the retaining groove 16. Accordingly, the outer diameter of the outer ring 1 is hardly enlarged radially outwards by the bent tail portion 20 upon installation. By adjusting the elasticity of the bent tail portion 20 and the width of the retaining groove 16, sufficient friction forces are produced between the retaining groove 16 and the bent tail portion 20. Accordingly, the shield plate 19 never rotates with reference to the outer ring 1.

When the bent tail portion 20 is press-fitted into the retaining groove 16 to install the shield plate 19 in the outer ring 1, the pushing tool with a flat tip end for pressing is abutted to the flat portion 20a, so that the shield plate 19 is forcedly inserted into the interior of the outer ring 1. Then, the bent tail portion 20 is elastically deformed for engagement of the bent tail portion 20 with the retaining groove 16. Since the flat tip end for pressing of the pushing tool is abutted to the flat portion 20a of the shield plate 19 in a relatively broader contact area. Accordingly, no part of the shield plate 19 is plastically deformed.

Since the outer ring 1 is not elastically deformed while the shield plate 19 is not plastically deformed in the embodiments as mentioned above, any harmful vibrations are never caused during the high speed rotation of the bearing. Such vibrations would be otherwise caused by unbalance in rotation, or undulation on the outer raceway.

In addition, there is no need of crimping the shield plate 19 for installation, so that the production cost of the rolling bearing with the seal device installed in it is reduced.

It should be noted that the scope of this invention is not limited to the embodiments described above, and that many modifications and improvements are covered by the claims of this application. For example, if necessary, the shield plate 19 is mounted to the either side of the outer ring 1, although the shield plate 19 is explained as disposed at one axial end of the outer ring 1 (e.g. right in FIG. 7 and in FIG. 11) in the embodiments above.

What is claimed is:

1. A seal device for use in a rolling bearing comprising an outer ring formed with an inner peripheral surface having axial end sections and a mid section between the axial end sections, the mid section formed with an outer raceway, an inner ring formed with an outer peripheral surface having axial end sections and a mid section between the axial end sections, the mid section formed with an inner raceway, the axial end sections of the inner peripheral surface of the outer ring being opposed to the axial end sections of the outer peripheral surface of the inner ring to form an opening, respectively, and a plurality of rolling elements rotatably provided in a space between the outer raceway and the inner raceway, the seal device comprising a retaining groove formed generally in a circumferential direction on at least one of the axial end sections of the inner peripheral surface of the outer ring, and a shield plate having an outer peripheral edge retained in the retaining groove and an inner peripheral edge placed adjacent to the opposed end section of the outer peripheral surface of the inner ring, the retaining groove being defined by a step portion formed closer to the outer raceway and having a relatively larger height and a projection formed closer to the opening and having a relatively smaller height, the shield plate made of an annular metal plate and comprised of radially inner and outer halves, the radially outer half formed with a flat portion and a bent tail portion folded radially inwards to cooperate with the flat portion to form the outer peripheral edge of the shield plate, so that the bent tail portion is capable of being elastically deformed, and the shield plate fitted into the outer ring with the outer peripheral edge abutted to the step portion and to the projection, so that the outer peripheral edge of the shield plate is retained by the retaining groove, whereby the space where the rolling elements are provided is shielded from outside.

2. The seal device of claim 1, wherein the bent tail portion is abutted to the step portion while the flat portion is faced to the opening.

3. The seal device of claim 1, wherein the flat portion is abutted to the step portion while the bent tail portion has a flat portion which is faced to the opening.

4. The seal device of claim 1, wherein the retaining groove has a bottom with a clearance between the bottom and the outer peripheral edge of the shield plate.

* * * * *